Figure 1:
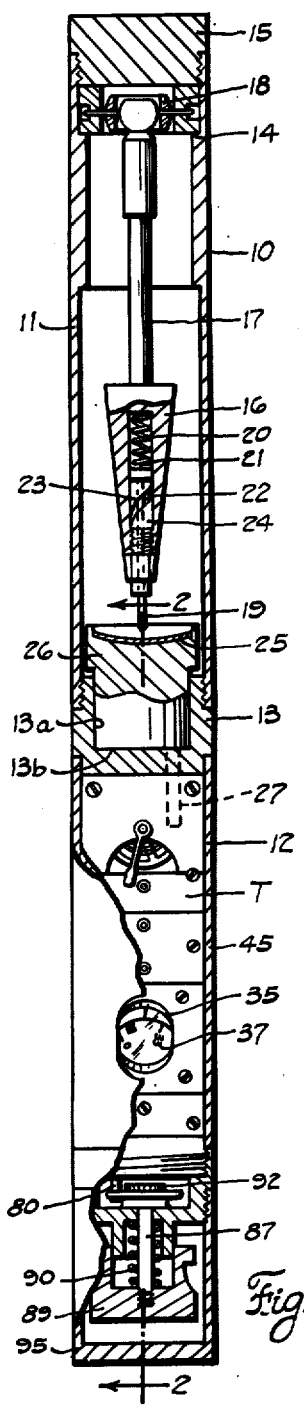

Aug. 16, 1949.   F. LENZEN ET AL   2,479,377
INCLINATION INDICATING INSTRUMENT
Filed Oct. 25, 1946   4 Sheets-Sheet 1

Inventors
Frederick Lenzen
John Gordon Jackson

By Jos E. Edwards
Attorney

Aug. 16, 1949.  F. LENZEN ET AL  2,479,377
INCLINATION INDICATING INSTRUMENT
Filed Oct. 25, 1946  4 Sheets-Sheet 2

Inventors
Frederick Lenzen
John Gordon Jackson

By Joe E. Edwards

Attorney

Aug. 16, 1949.   F. LENZEN ET AL   2,479,377
INCLINATION INDICATING INSTRUMENT
Filed Oct. 25, 1946   4 Sheets-Sheet 3
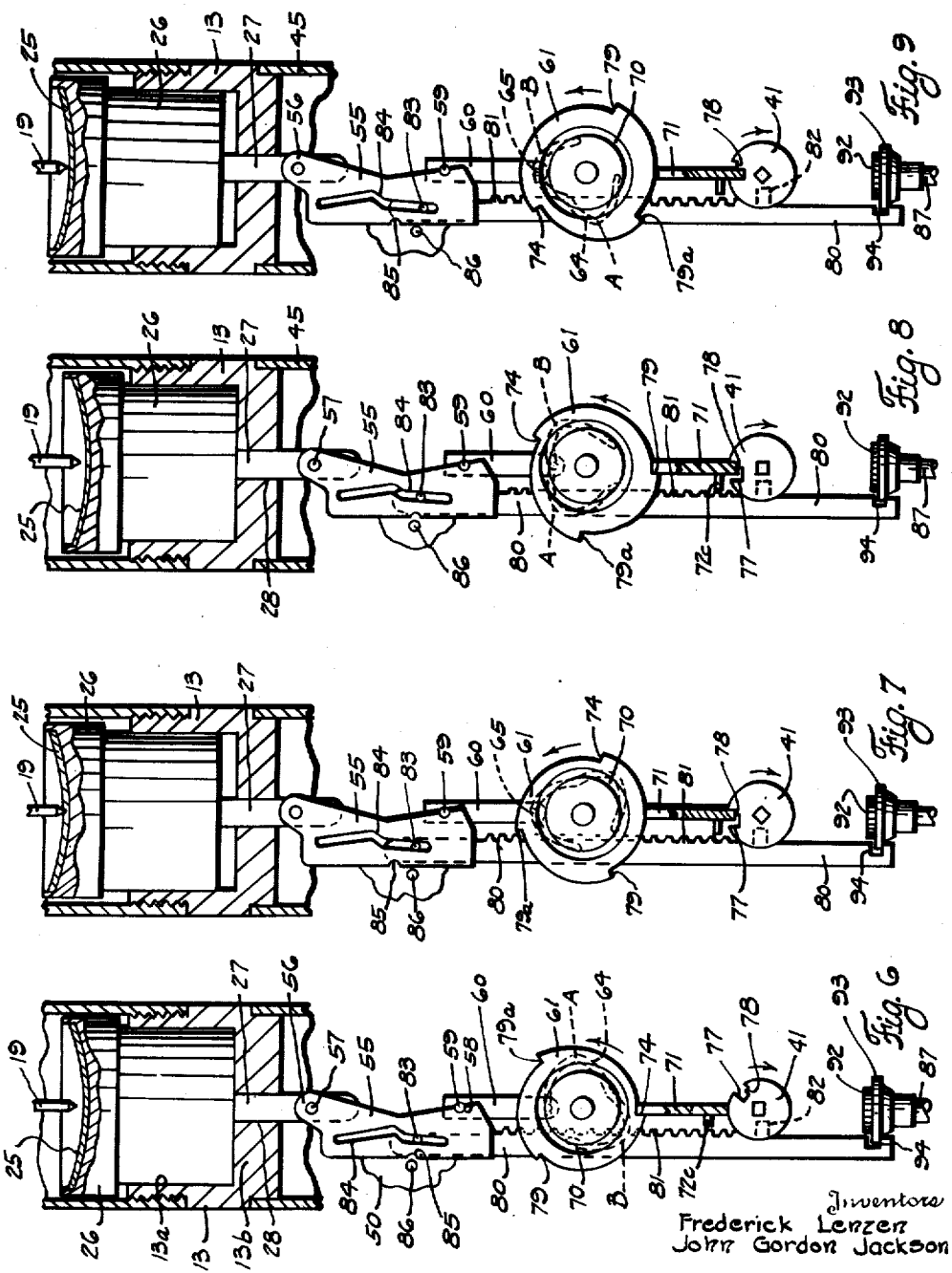

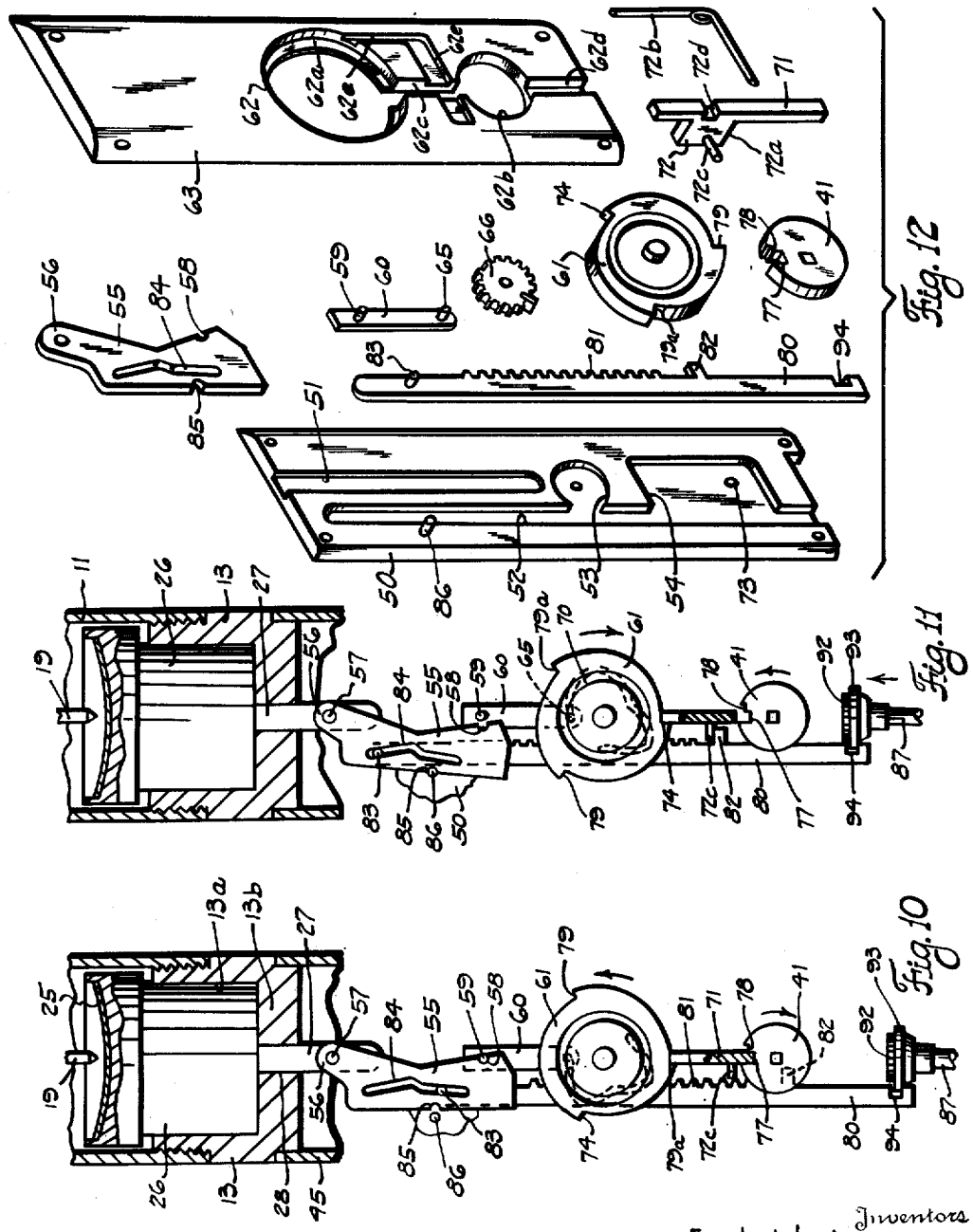

Patented Aug. 16, 1949

2,479,377

UNITED STATES PATENT OFFICE 2,479,377

INCLINATION INDICATING INSTRUMENT

Frederick Lenzen and John Gordon Jackson, Denver, Colo., assignors to Eastman Oil Well Survey Company, Denver, Colo., a corporation of Delaware Application October 25, 1946, Serial No. 705,606

15 Claims. (Cl. 33—205.5)

This invention relates to new and useful improvements in inclination indicating instruments.

The invention relates specifically to deviation or "drift" indicators which are used in the surveying of well bores and which are generally referred to as mechanical type drift indicators as distinguished from a photographic type of instrument. The invention may be termed to be an improvement on the inclination indicating instrument shown in the patents to Opocensky, No. 2,334,950, issued November 23, 1943, and Wiley, No. 2,305,944, issued December 22, 1942.

One object of the present invention is to provide an improved instrument which may be lowered into the well bore and which will accurately indicate and record the deviation or drift of said bore from the vertical, whereby the angular disposition of the bore either during drilling or subsequent thereto, may be determined.

An important object of the invention is to provide an improved inclination indicator, wherein the record is made by a mechanical marking means and also wherein the marking means is actuated more than once during each cycle of operation so that any movement of either the instrument or the inclination indicator thereof during the recording operation will be visibly indicated by the fact that the plurality of marks made during each cycle will not be superimposed one upon the other as they would be if all parts are stationary at the time that the record is marked.

A particular object of the invention is to provide an instrument including a plumb bob having a marking element and also including a record member normally spaced from said element, together with improved and simplified actuating means for imparting a reciprocating movement to the record member to engage said member with the element to mark the disk and thereby record the position of the plumb bob with respect to the center of the element; said actuating means being operated at two distinct times with a predetermined interval therebetween, whereby a double marking of the record member is effected.

A further object of the invention is to provide an improved instrument of the character described, wherein the movable record member is locked against any accidental or unintentional movement prior to the time of operation and also subsequent to such operation so that any danger of the instrument being accidentally operated is obviated.

Still another object of the invention is to provide an improved inclination indicating instrument of the character described wherein the movable record member is normally operatively connected to the time controlled actuating mechanism and is arranged to be disconnected from said mechanism and locked against any possible movement, during the time that said actuating mechanism is being reset after having been operated.

A further object of the invention is to provide a device of the character described wherein the various movable elements of the actuating mechanism are constructed to prevent any danger of their binding or becoming jammed during resetting thereof, whereby the possibility of damage to the timing mechanism during the resetting operation is obviated.

The construction designed to carry out the invention will be hereinafter described together with other features of the invention.

Figure 4:
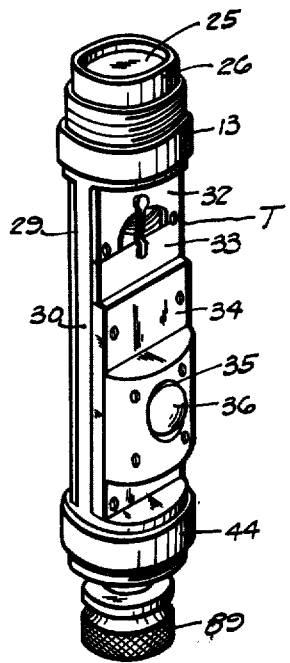
Figure 5:
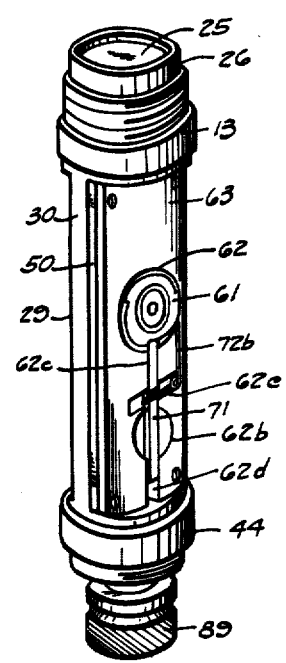
Figure 13:
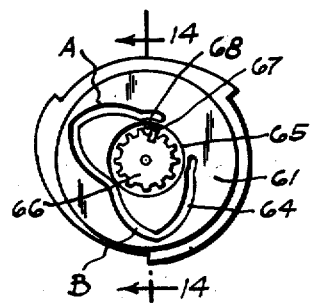
Figure 14:
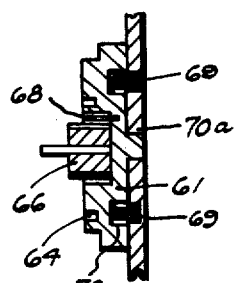
Figure 2:
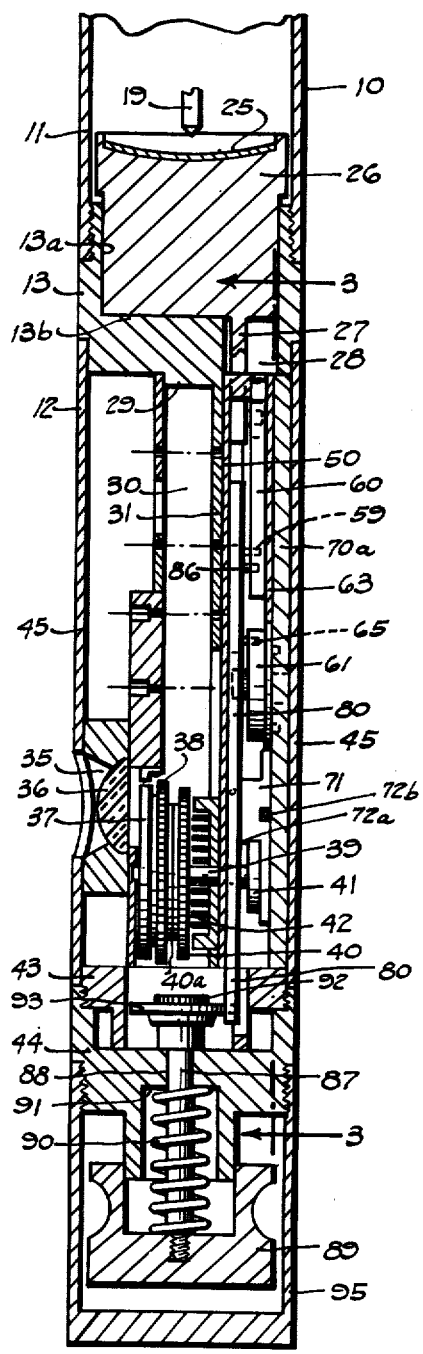
Figure 3:
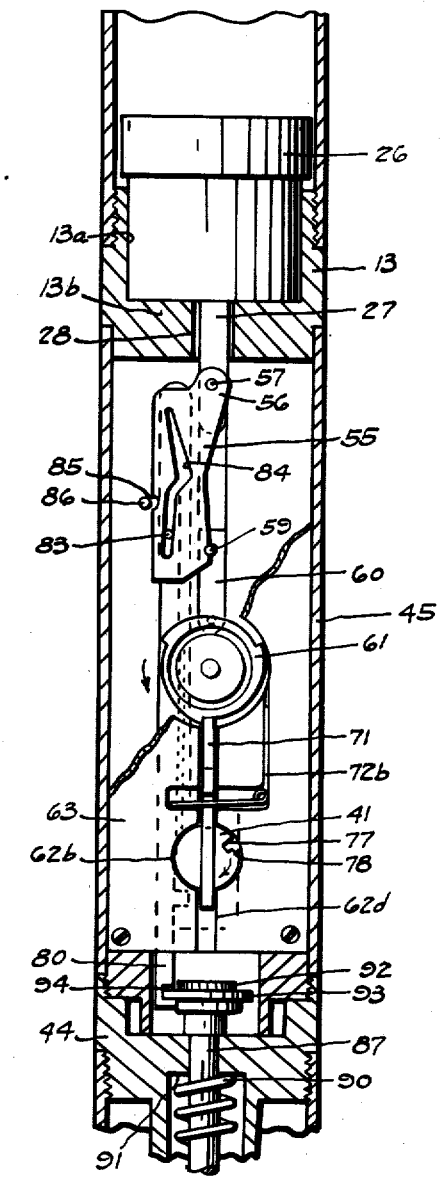

The invention will be more readily understood from a reading of the following specification and by reference to the accompanying drawing, wherein an example of the invention is shown, and wherein:

Figure 1 is a view partly in section and partly in elevation, of an inclination indicating instrument constructed in accordance with the invention, Figure 2 is an enlarged, transverse, vertical sectional view taken on the line 2—2 of Figure 1 and showing the operating mechanism, the details of the usual timing mechanism being omitted, Figure 3 is a transverse, vertical sectional view taken on the line 3—3 of Figure 2, Figure 4 is an isometric view of the operating and timing assembly, with the same removed from the instrument casing or housing, Figure 5 is a similar view of the side opposite that shown in Figure 4, Figures 6 to 10 are schematic views of the operating mechanism for the index or record member, said views illustrating the various positions of said mechanism during actuation thereof, Figure 11 is a schematic view of the operating mechanism showing the position of the parts during the resetting thereof, Figure 12 is an exploded view of the various parts of the actuating mechanism, together with supporting plates on which these members are mounted, Figure 13 is an elevation of the inner face of the actuating cam, and, Figure 14 is a transverse sectional view, taken on the line 14—14 of Figure 13.

In the drawings, the numeral 10 designates an elongate tubular casing which is preferably constructed of two main sections 11 and 12 which are connected to each other by means of a coupling collar or block 13. The upper section 11 is formed with an internal annular flange 14 which is located at its upper portion and the extreme upper end of the section is closed by a suitable plug or cap 15. A plumb bob 16 is mounted within the upper section and is provided with an upwardly extending stem 17, the upper end of which is pivotally mounted by means of a Cardan suspension 18 which is supported upon the internal shoulder 14. As is well known, a Cardan suspension permits a universal movement of the element supported thereby and thus the plumb bob 16 is maintained in a vertical position, regardless of the inclination of the casing 10.

The plumb bob may be of any desired construction but it is preferable that it be formed with a depressible marking element or stylus 19 which projects from the lower end thereof. The marking element is normally maintained in a lowered position by means of a coil spring 20 which is confined within an axial bore 21 formed in the plumb bob. Although not essential, it is desirable that the marking element or stylus 19 be rotated as it is depressed and to effect such rotation, the stylus is formed with a lug 22 which engages or rides within a helical groove 23 provided in a sleeve 24 which is mounted within the bore 21 of the plumb bob. When the marking element or stylus is depressed, that is, moved upwardly within the bore of the plumb bob, the co-action between the lug 22 and the helical groove imparts a rotation to the marking element.

The plumb bob 16 overlies the record member or disk 25 which is constructed of a coated paper or other suitable material and which is mounted within the recessed upper end of a circular carrier or support 26. The support or carrier 26 is slidable axially within the bore 13a of the coupling collar 13 and said collar has a bottom 13b which extends transversely across the casing and which forms a stop for limiting the downward movement of the carrier or support. Normally, the carrier is in the position shown in Figure 1 with the record disk 25 spaced from the lower pointed end of the marking element or stylus 19. When the carrier 26 is moved upwardly, the record disk 25 is moved into engagement with the stylus or marking element and serves to depress the stylus under tension of the coil spring 20. Such depression of the stylus causes a rotation thereof, whereby the pointed end of said stylus forms a dot or mark on the record disk 25. Such mark is representative of the inclination of the casing 10 from the vertical for obviously the marking stylus will form said mark in accordance with its position relative to the casing. Thus, the position of the mark with respect to the center of the record disk 25 will indicate the number of degrees of inclination from the vertical of the casing 10.

For imparting an axial reciprocation to the support or carrier 26 so as to move the record disk 25 into engagement with the marking stylus 19, an operating mechanism is mounted within the lower section 12 of the casing 10. This section also houses a timing or clock mechanism T (Figure 2) which is of the usual construction. The operating mechanism which will be hereinafter described, includes an operating rod 27 which rod is suitably secured to or made integral with the lower end of the disk carrier 26. As is clearly shown in Figure 2, the rod 27 extends downwardly through a slot or opening 28 which is formed in the bottom 13b of the coupling 13, whereby the extreme lower end of the rod 27 depends into the upper portion of the lower section 12 of the casing. The lower end of this rod is adapted to be connected with the operating mechanism and through such operating mechanism is adapted to be reciprocated, whereby the carrier 26 is moved upwardly into engagement with the marking stylus.

The arrangement is such that the operating mechanism is controlled in its actuation by the timing mechanism T. The timing mechanism is set so that a predetermined time will elapse before operation will occur and thus, a sufficient time is allowed to permit lowering of the device into a well bore to the desired position therein. When the operating mechanism is actuated, the carrier or support is moved upwardly so as to engage the record disk with the marking stylus and form a mark or dot on said record disk, which mark is representative of the number of degrees of inclination of the casing. After engagement with the marking stylus, the support or carrier is again returned to its lowered position, as shown in Figure 1. A predetermined time is then permitted to elapse, this period being relatively short, after which the operating mechanism again raises the support into engagement with the marking stylus to form a second mark on the record disk 25. If the plumb bob is at rest upon the first upward movement of the carrier or support 26 and remains at rest during the period of time between the two operations of the carrier, then the second mark will be superimposed upon the first mark so that only a single indication is had. However, if the plumb bob is not at rest during the time elapsed between the two marking operations, then two separate indications will be produced. Thus, the operator can immediately determine whether or not the plumb bob was immovable during the recording and therefore, an accurate indication is secured.

As has been stated, the operating mechanism for imparting reciprocation to the carrier or support 26, as well as the timing or clock mechanism is mounted in the lower section 12 of the casing. The clock mechanism includes a body portion 29 which has the coupling element 13 preferably made integral with its upper end. The body is recessed to form a cavity for receiving the various gear trains (not shown) of the clock mechanism and this recessing of the body forms vertical standards or supports 30 at each side of said body, said supports being connected together by an integral rear wall 31 (Figure 2). The front wall of the body 29 of the clock mechanism is closed by plates 32, 33 and 34 (Figure 4) which are suitably attached to the vertical side standard 30 by screws. A window 35 is formed in the plate 34 and is covered by a suitable lens 36. An indicating dial 37 which is attached to the resetting gear 38 of the clock mechanism has a portion thereof visible through the lens 36 and window 35. The resetting gear 38 is fixed on the main shaft 39 of the clock mechanism and is adapted to be connected with the drive gear 40 of said clock mechanism by clutch plates 40a, such connection being made in the usual manner. The main spring 42 of the clock mechanism surrounds the drive shaft 39 and is adapted to drive the gear 40 and shaft 39. Of course, the timing gears which are mounted in the upper portion of the housing or body 20 and which are not shown, control the speed of rotation of the shaft 29. A timing cam 41 is mounted on the outer end of the clock shaft 39 and this cam is rotated at a predetermined speed by the clock mechanism.

The lower end of the body 20 of the clock mechanism T is provided with an integral collar or ring 43 and this ring is adapted to be threaded within a coupling block 44. A cylindrical housing 45 is confined between the coupling elements 43 and the coupling block 44 and completely houses both the timing mechanism and the operating mechanism, which will now be explained.

The operating mechanism is mounted on the rear wall 31 of the body of the clock mechanism, as is clearly shown in Figure 2. The various parts of the operating mechanism are shown in Figure 12 and these parts include a rear supporting plate 50 which is suitably attached by screws to the rear wall 31. The plate 50 extends substantially throughout the length of the wall 31 and has an elongate guide groove 51 in its outer face, said groove extending downwardly from the upper end thereof to a point at about mid-heighth of the plate and being disposed substantially at the center line of said plate. A second guide groove 52 is formed in the outer surface of the plate and extends longitudinally throughout substantially the length of the plate terminating just short of the top thereof. A circular recess 53 is also formed in the plate being disposed immediately below the groove 51 and having a portion thereof intersecting or communicating with the longitudinal groove 52. Below the circular recess 53 is an angular recess 54, this latter recess being in direct communication with the longitudinal groove 54.

When the plate 50 is in position secured to the body 31, the elongate groove 51 is in alignment with and receives the lower depending end of the operating rod 27 which, as has been explained, is attached to the disk carrier 26. Thus, the groove 51 provides a channel for guiding the movement of the operating rod 27 in its reciprocation.

A connecting member 55 has an ear 56 formed integral with its upper end and this ear is connected by a pivot pin 57 with the operating rod 27, whereby said member is pivotally attached to said rod; however, a vertical movement of the member 55 will impart a similar movement to the operating rod and also to the record carrier attached thereto. The lower portion of the connecting member 55 is provided with a semi-circular recess 58 in its longitudinal edge and this recess is adapted to engage an outwardly projecting pin 59 which is provided at the upper end of an actuating bar 60. The bar 60 is disposed within the longitudinal groove 54 and is slidable therein. When the connecting member 55 has its recess 58 engaged with the pin 59 of the actuating bar it will be obvious that a reciprocation of the bar will transmit reciprocation to the operating rod 27 of the carrier through the connecting member 55.

For imparting reciprocation to the actuating bar, a circular rotatable actuating cam 61 is provided. This cam is disposed and supported within a circular opening 62 which is formed in an outer retaining plate 63. The plate 63 overlies the plate 51 and may be suitably fastened thereto by screws, the upper portion of said plate functioning to maintain the actuating bar 60 and the connecting member 55 in proper position. It is noted that the rear surface of the plate 63 is recessed to accommodate the pivoted connecting member 55. The actuating cam 61 abuts and bears against an annular shoulder 62a formed within the circular opening 62. The inner surface of the cam is clearly shown in Figure 13 and is provided with a cam groove 64 which groove may be divided into two sections A and B. The actuating bar 60 has a second outwardly extending pin 65 at its lower end and this pin engages within the groove 64 of the cam. It will be evident that when the cam 61 is rotated in a counterclockwise direction in Figures 6 to 10, the travel of the pin within the cam groove 64 will impart a double reciprocation to the actuating bar 60. This double reciprocating movement which is effected as the pin travels first through the section A and then through the section B of the cam groove 64 is transmitted through the connecting member 55 to the operating rod 27, whereby the record disk carrier 26 is reciprocated to engage the marking element or stylus 19 two successive times.

The inner surface of the actuating cam 61 is also provided with a central circular recess 65 within which is mounted a resetting gear 66. The resetting gear merely floats within the recess and has a radial lug 67 which projects outwardly outside of the gear teeth and which is adapted to engage a stationary pin 68 disposed within the recess 65. As will be explained in detail, the cam rotates in a counterclockwise direction in Figures 6 to 10 in order to reciprocate the record member and such counterclockwise rotation of the cam is halted when the connecting pin 65 of the actuating bar reaches the end of the cam groove, as will be explained. In order to reset the cam to its original position, the gear 66 is rotated and the engagement of its lug 67 with the pin 68 will permit the cam to be rotated clockwise (Figure 10) to reset it to its original position.

After resetting of the cam to its original starting position and due to the floating mounting of the gear 66, said gear can rotate in a counterclockwise rotation (Figure 6) independently of the cam and without imparting such counterclockwise rotation to said cam. The power for rotating the cam in a counterclockwise direction in Figures 6 to 10 during operation of the mechanism is provided by a flat main spring 69 which is mounted within an annular groove 70 provided in the outer face of the cam 61. This main spring has one end secured to the cam and its other end secured to an outer retaining or bridge plate 70a (Figure 2) which covers the plate 63 and confines the cam within the circular opening 62. The spring 69 is so arranged as to constantly exert its force to rotate the cam 61 in a counterclockwise direction in Figures 6 to 10.

For locking the actuating cam 61 against rotation until the desired time, a locking bar 71 is provided. This locking bar is clearly shown in Figure 12 and includes an extension 72 which extends inwardly therefrom. The timing cam 41 which is secured to the main shaft 39 of the timing mechanism is disposed within the angular recess 34 of the inner plate 50 and within a circular opening 62b in the plate 63 so that said cam is located below the actuating cam 61. The main shaft 39 of the timing mechanism projects through the opening 73 formed in the plate 50 (Figure 12).

The locking bar 71 is disposed between the timing cam 41 and the actuating cam 61 and the lower portion of the locking bar overlies the timing cam. The upper end of the bar is movable within a slot 62c in the plate 63 and its lower end is movable within a groove 62d also within said plate. The bottom edge 72a of the extension 72 of said locking bar rides upon the periphery of the timing cam while the extreme upper end of the locking bar is adapted to move into close proximity with the periphery of the actuating cam. The bottom 72a of the extension 72 is held in constant engagement with the periphery of the timing cam 41 by a spring 72b which engages within a notch 72d in the locking bar and which is disposed within an angular recess 62e in the plate 63. The periphery of the actuating cam is formed with a radial offset or shoulder 74 and when the locking bar has its extension riding on the periphery of the timing cam 41, the upper end of the locking bar is disposed in the path of the shoulder 74. This position of the parts is illustrated in Figure 6 and this may be termed the starting position.

The timing cam rotates in a clockwise direction and is formed with a notch or recess 77 in its peripheral portion. A shoulder or step 78 is provided in the notch 77 and as the timing cam rotates, the stepped portion of the notch is finally moved beneath the extension 72 of the locking bar. The locking bar drops into the notch engaging the step 78, as shown in Figure 7, thereby lowering the upper end of the locking bar and moving said bar out of the path of the shoulder 74 formed on the periphery of the cam. This permits the main spring 69 to impart a counter-clockwise rotation to the actuating cam 61 and this movement continues until a second shoulder 79 on the cam 61, which projects a further distance radially than the shoulder 74, engages the upper end of the locking bar 71 and again halts rotation of the cam 61. This initial rotation of the cam is sufficient to permit the pin 65 of the actuating bar 60 to travel through the first section A of the cam groove 64, whereby a reciprocation is imparted to the actuating bar and through the connecting member 55 and rod 27 to the carrier 26. This results in the record disk 25 engaging the stylus to mark the disk.

The parts remain in the position shown in Figure 8 until the timing cam 41 rotates further to move the notch 77 beneath the extension 72 of the locking bar (Figure 9). When this occurs, the locking bar is again further lowered to cause its upper end to move out of the path of the shoulder 79 on the cam 61 so that said cam is again released for further rotation. This counterclockwise rotation of the cam 61 continues until the pin 65 of the actuating bar has traversed the section B of the cam groove 64 at which time a third offset or stop shoulder 79a on the cam engages the upper end of the locking bar, said stop shoulder projecting outwardly a further radial distance than the shoulder 79 (Figure 10). Thus, further rotation of said cam is halted. During the time that the pin 65 of the actuating bar traversed the section B of the cam groove 64, the record carrier was again reciprocated to again mark the record disk by its engagement with the stylus. Thus, during one revolution of the cam 61, the record carrier and its disk is reciprocated twice and if both markings are superimposed one above the other, it is evident that the plumb bob and its marking element did not move in the interim. If the plumb bob was moving or swinging between the two marking operations, two separate marks would appear on the record disk and thus the double marking arrangement assures that the operator will know that an accurate record was made.

After actuation of the disk to perform the double marking, it is necessary to reset the mechanism and for this purpose an elongate resetting bar 80 is provided. The bar 80 is slidably mounted within the longitudinal groove 52 of the plate 50 (Figure 12) and said bar has a gear rack 81 formed on one longitudinal edge thereof. The teeth of the gear rack are adapted to engage the teeth of the resetting gear 66 which is disposed within the circular recess 65 of the actuating cam 61 and obviously when the gear rack is moved upwardly within the groove 52, a clockwise rotation (Figures 6 to 10) is imparted to the gear. The lug 67 which is connected in this gear engages the pin 68 within the recess of the cam and transmits this clockwise rotation to said cam. Therefore, when the resetting bar is moved upwardly within its groove 52, a clockwise rotation of the actuating cam is effected to return the cam to its original starting position as shown in Figure 6. After resetting of the cam, the bar 80 may be returned to its lowered position with the gear 66 rotating in a clockwise direction (Figure 6) without imparting any rotation to the cam because obviously the lug 67 of said gear moves away from the pin 68 of the cam.

At the time that the parts are in a position ready to be reset, as shown in Figure 10, the locking bar 71 is in a lowered position engaging the notch 77 of the timing cam. In order to assure disengagement of this locking bar from the notch, the resetting bar 80 is formed with an inwardly directed lug 82. This lug is so positioned that after a sufficient clockwise rotation of the actuating disk 61 has occurred to move the shoulder 74 on said cam to the position shown in Figure 6, the lug 82 engages an outwardly extending pin 72c which projects outwardly from the extension 72 of the locking bar. This engagement of the lug 82 with the pin 72 lifts the locking bar out of the notch 77 of the timing cam, whereby said timing cam may be subsequently reset, as will be explained, and also whereby the upper end of the locking bar is again moved into the path of the shoulder 74.

It is desirable that the record carrier 26 be locked against any movement during the resetting operation and for this purpose the upper end of the resetting bar 80 is formed with a laterally projecting pin 83 which engages an inclined offset cam slot 84 provided in the connecting member 55. The disposition of the cam slot is such that when the resetting bar is in its lowered position (Figures 6 to 10) the pin 83 bears against the slot to urge and hold the pivoted connected member in a position with its recess 58 engaging the connecting pin 59 of the actuating bar 60. Upon initial upward movement of the resetting bar 80, the pin 83 coacting with the cam slot 84 swings the connecting member 55 to the position shown in Figure 11, whereby a recess 85 on the opposite longitudinal edge of the connecting member engages a locking pin 86 which is secured to the plate 50. Thus, upon initial upward movement of the resetting bar, the connecting member is first disconnected from the actuating bar and is locked against the locking pin 86, whereby the connecting member 55 and the record carrier 26 secured thereto cannot move upwardly during the resetting of the device. Continued upward movement of the resetting bar after the connecting member and record carrier are locked results in a clockwise rotation of the actuating cam 61 to return this cam to its original or starting position. During this clockwise rotation of the cam 61, the actuating bar 60 merely reciprocates within the groove 51, but obviously since it has been disconnected from the record carrier, said record carrier is not reciprocated. During final upward movement of the resetting bar, the lug 82 on said bar engages the pin 72c of the locking bar to lift said bar from within the notch 71 of the timing cam, whereby said cam may be subsequently reset in accordance with the desired timing conditions. In order to reset the timing cam when the operating mechanism is reset, and also to actuate or impart upward movement to the resetting bar 80, a resetting stem 87 is provided. As is clearly shown in Figure 2 the stem 87 extends through an opening 88 in the coupling block 44 and has a knurled hand knob 89 on its lower end. A coil spring 90 which surrounds the stem is confined between the knob 89 and an internal shoulder 91 which is formed within the block, this spring constantly urging the stem toward a lowered position. The upper end of the stem is formed with a resetting pinion 92 which is secured thereto and immediately below the pinion an annular flange 93 is formed. This flange is adapted to engage within a groove or recess 94 in the extreme lower end of the resetting bar 80, whereby said bar is coupled or connected to the stem with the result that upward movement of the stem will cause an upward movement of the resetting bar 80. A cap member 95 which is threaded onto the block 44 normally encloses the knob 89 and the resetting stem.

When it is desired to reset the mechanism, the cap 95 is removed and the stem 87 is moved upwardly so as to raise the resetting bar 80 within its longitudinal groove 52 in the plate 50. As has been explained, this upward movement first causes an uncoupling of the actuating bar 60 from the record carrier by the swinging of the connecting member 55; at the same time the connecting member is locked by its engagement with the locking pin 86 to lock the record carrier during the resetting operation. Continued upward movement of the resetting stem and locking bar results in rotating the actuating cam back to its original position and then causes a lifting of the locking bar to disengage it from the notch 71 of the timing cam 41. At the completion of the resetting of the operating mechanism, the parts are in the position shown in Figure 11 and the upward movement of the stem 87 which accomplishes the resetting of the operating mechanism has caused the resetting pinion 92 to engage the teeth of the setting gear 38 of the clock mechanism, which gear is located in a plane above the teeth of the resetting pinion. After such engagement of the resetting pinion with the gear 38 of the timing mechanism, it is only necessary to rotate the stem 87 and thereby impart a rotation to the resetting gear which through the clutch mechanism 43 will impart rotation to the main shaft 39 of the timing mechanism on which the timing cam 41 is mounted. Thus, the timing cam may be set so that any desired time may elapse before the step 78 and the notch 71 again move beneath the locking bar to permit actuation of the operating mechanism. As has been pointed out, the setting gear carries a dial 31 which is visible through the window 35 and by observing the dial, the operator may rotate the gear 38 to set the timing cam in any desired manner. After resetting the resetting bar 80 is lowered to its original position and the parts are in starting position as shown in Figure 6.

In the operation of the device, assuming that the same is to be prepared to obtain a reading, the parts are in the position shown in Figure 10, to which position they have been moved upon the previous recordings or marking operations. At this time, the locking bar 71 is engaged with the notch 71 of the timing cam and the connecting member 55 is in a position connecting the record carrier 26 with the actuating bar 60.

The device is, of course, at the surface of the well and to accomplish resetting, the resetting stem 87 is depressed under tension of the spring 90 so that the resetting bar 80 of the operating mechanism is lifted. As has been explained lifting of the bar first disconnects the member 55 from the actuating bar 60 and engages this member with a locking pin 86 whereby the carrier 26 is positively locked against movement during the resetting operation. Continued lifting of the bar rotates the actuating cam 61 in a clockwise direction in Figures 6 to 11 through the medium of the gear rack 81 and gear 65 which gear as explained has the lug 67 moving into engagement with the pin 68 secured in the cam. After the cam 61 has been returned to its original starting position (Figure 6), continued lifting of the bar 80 causes the lug 82 to engage the pin 72c to lift the locking bar 71 out of the notch 71 of the timing cam and at the same time move its upper end into the path of the first shoulder 74 of the actuating cam. At this time the resetting of the operating mechanism is complete and the resetting stem is then moved upwardly a slight distance further to engage its resetting pinion with the setting gear 38 of the timing mechanism, after which the stem is rotated to properly set the timing cam 41 in accordance with the desired lapse of time. The resetting bar 80 is then lowered to its original position, such lowering being permitted because the gear 65 of the cam is free floating and may rotate back to its starting position without imparting reverse rotation to the cam. Lowering of the bar 80 effects a reconnection of the disk carrier 26 with the actuating bar 60 through the connecting member 55.

The parts remain in this position during the lowering of the device through the well and finally said device reaches the elevation at which the record is to be made. The instrument is then permitted to remain at rest until such time as the offset or shoulder 78 in the timing cam moves beneath the locking bar. It might be noted that with the parts in the position shown in Figure 6 which is the position during lowering, the record carrier is positively locked against any unintentional or accidental movement because the pin 68 of the actuating bar is firmly engaged within the cam groove to prevent any upward movement of the actuating bar, connecting member 55 or record carrier 26.

As the offset or step 78 moves beneath the locking bar, said locking bar is lowered to the position shown in Figure 7 which moves its upper end out of the path of the shoulder 74 allowing the main spring 69 of the actuating cam 61 to rotate said cam in a counterclockwise direction in this figure. Such counterclockwise rotation continues until the second shoulder 79 on the actuating cam strikes the upper end of the locking bar and by this time, the pin 68 on the actuating bar has moved through the first section A of the cam groove 64. Such movement of the pin through this groove results in a reciprocation of the record carrier so that the disk 25 carried thereby is engaged with the marking element or stylus 19 to mark said disk.

The timing mechanism continues to run so as to move the notch 77 below the locking bar and when this occurs, said locking bar is further lowered so that its upper end moves out of the path of the second shoulder 78 of the actuating cam, this position being shown in Figure 9. Immediately upon this further lowering of the locking bar, the actuating cam is again released for further counterclockwise rotation so that the pin 65 of the actuating bar will traverse the second section B of the cam groove thereby resulting in a second reciprocation of the record carrier and disk to form a second mark on said disk. If the plumb bob and marking stylus remain immovable as they should between the two marking operations, the marks formed thereon will be superimposed one upon the other so that substantially only a single mark will appear on the disk. If there was any movement of the plumb bob two separate marks will appear on the disk to advise the operator that an inaccurate record was obtained. It might be noted that during the time that the connecting member 55 is connecting the actuating bar 60 with the record carrier, which is during the operation of the mechanism, the co-action between the pin 83 at the upper end of the resetting bar with the cam slot 84 in the member 55 functions to lock the connecting member 55 in its engaged position, whereby it is impossible for the member 55 to swing outwardly to disengage the actuating bar. Rotation of the actuating cam 61 continues until the pin 65 of the actuating bar 60 reaches the end of the cam groove, at which time the stop shoulder 78a strikes the upper end of the locking bar 71, as shown in Figure 10. This completes the cycle of operation of the device and the instrument is removed to the surface, where the record is read. When it is again desired to employ the instrument a new record disk 25 is inserted in the disk carrier and the mechanism is reset as has been described.

It is pointed out that the mechanism is relatively simple and provides for a double marking of the record disk which assures the accuracy of the record obtained since it provides information regarding any movement of the plumb bob or instrument during operation of said mechanism. The double reciprocation of the record carrier is accomplished during one revolution or one cycle of operation of the actuating cam. The arrangement is such that a positive connection between the actuating bar 60 and the record carrier is had when the device is in operating position and unintentional disconnection is prevented. Also, during resetting of the mechanism, the connecting member and the record carrier are positively locked against any possible movement through the engagement of the member 55 with the locking pin 86. In the event that the locking bar 71 should not be lifted out of the notch 77 before a rotation is imparted to the resetting stem to reset the timing mechanism, there will be no damage to the timing mechanism because the clutch 40a will permit slippage between the resetting gear 38 and the remainder of the timing mechanism.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. An inclination indicating device including a casing, a gravity responsive marking element within the casing, a movable record carrier below the marking element and normally spaced therefrom, an actuating bar arranged to be reciprocated, a connecting member pivoted to the record carrier and movable into a position whereby it is connected to the actuating bar for connecting said carrier with said actuating bar so that reciprocation of said bar imparts movement to said carrier to engage the same with the marking element, and rotatable actuating means operatively connected with the actuating bar for effecting reciprocation thereof at spaced time intervals during a single revolution of said actuating means, whereby said carrier is engaged with the marking element at predetermined time intervals.

2. An inclination indicating device including, a casing, a gravity responsive marking element within the casing, a movable record carrier below the marking element and normally spaced therefrom, an actuating bar arranged to be reciprocated, a connecting member pivoted to the record carrier and movable into a position whereby it is connected to the actuating bar for connecting said carrier with said actuating bar so that reciprocation of said bar imparts movement to said carrier to engage the same with the marking element, rotatable actuating means operatively connected with the actuating bar for effecting reciprocation thereof at spaced time intervals during a single revolution of said actuating means, whereby said carrier is engaged with the marking element at predetermined time intervals, and a timing mechanism for controlling the operation of the rotatable actuating means.

3. An inclination indicating device including, a casing, a gravity responsive marking element within the casing, a movable record carrier below the marking element and normally spaced therefrom, an actuating bar arranged to be reciprocated, a connecting member pivoted to the record carrier and movable into a position whereby it is connected to the actuating bar for connecting said carrier with said actuating bar so that reciprocation of said bar imparts movement to said carrier to engage the same with the marking element, rotatable actuating means operatively connected with the actuating bar for effecting reciprocation thereof at spaced time intervals during a single revolution of said actuating means, whereby said carrier is engaged with the marking element at predetermined time intervals, a timing mechanism for controlling the operation of the rotatable actuating means, and a movable resetting bar adapted to be operatively engaged with the timing mechanism and with the rotatable actuating means for resetting both the mechanism and means after operation thereof.

4. An inclination indicating device as set forth in claim 3, wherein the resetting bar is operatively engaged with the pivoted connecting member and functions to disconnect said member from the actuating bar during the resetting operation, whereby danger of the record carrier being moved during the resetting operation is obviated.

5. An inclination indicating device including, a casing, a gravity responsive marking element within the casing, a movable record carrier below the marking element and normally spaced therefrom, an actuating bar arranged to be reciprocated, a connecting member pivoted to the record carrier and movable into a position whereby it is connected to the actuating bar for connecting said carrier with said actuating bar so that reciprocation of said bar imparts movement to said carrier to engage the same with the marking element, rotatable actuating means operatively connected with the actuating bar for effecting reciprocation thereof at spaced time intervals during a single revolution of said actuating means, whereby said carrier is engaged with the marking element at predetermined time intervals, a timing mechanism for controlling the operation of the rotatable actuating means, a movable resetting bar adapted to be operatively engaged with the timing mechanism and with the rotatable actuating means for resetting both the mechanism and means after operation thereof, means on the resetting bar engaging the pivoted connecting member for swinging said member into a position disconnecting the same from the actuating bar when the resetting bar is moved to reset the timing mechanism and rotatable actuating means, whereby said actuating bar cannot impart movement to the record carrier, and means for positively locking the pivoted connecting member and record carrier connected thereto against movement when said member is disengaged from the actuating bar.

6. An inclination indicating device including, a casing, a gravity responsive marking element within the casing, a movable record carrier below the marking element and normally spaced therefrom, an actuating bar arranged to be reciprocated, a connecting member pivoted to the record carrier and movable into connected and disconnected positions with respect to the actuating bar, rotatable actuating means operatively connected with the actuating bar for effecting reciprocation of the bar whereby when the bar is connected to the connecting member the record carrier is reciprocated by said bar and is engaged with the marking element, spring means for driving the rotatable actuating means, and a locking member co-acting with the actuating means for controlling the release thereof to allow operation thereof.

7. An inclination indicator as set forth in claim 6, together with a timing mechanism associated with the locking member to operate said member and thereby permit operation of the actuating means at the desired predetermined time.

8. An inclination indicator, as set forth in claim 6, together with a resetting means for returning the actuating means to its original starting position after it has been actuated.

9. An inclination indicator as set forth in claim 6, together with a movable resetting means adapted to be operatively connected with the rotatable actuating means for resetting said actuating means and returning it to its original position after it has been operated, said resetting means also co-acting with the connecting member to maintain it in connected position with the actuating bar during the operation of the actuating means and bar and for swinging said member to disconnect the same from the actuating bar during the resetting operation.

10. An inclination indicating device including, a casing, a gravity responsive marking element within the casing, a movable record carrier below the marking element and normally spaced therefrom, an actuating bar arranged to be reciprocated, a connecting member pivoted to the record carrier and movable into connected and disconnected positions with respect to the actuating bar, rotatable actuating means operatively connected with the actuating bar for effecting reciprocation of the bar whereby when the bar is connected to the connecting member the record carrier is reciprocated by said bar and is engaged with the marking element, spring means for driving the rotatable actuating means, a locking member co-acting with the actuating means for controlling the release thereof to allow operation thereof, a timing mechanism associated with the locking bar for controlling the operation of said locking bar, whereby the actuating means is released for operation at a predetermined desired time, and a resetting means adapted to co-act with the rotatable actuating means and with the timing mechanism for returning the actuating means to starting position after operation and for resetting the timing mechanism.

11. An inclination indicator as set forth in claim 10, wherein the resetting means has an operative connection with the connecting member and functions to lock said member in a position connected with the actuating bar during operation of the rotatable actuating means and also acts to disconnect said member from the actuating bar during the resetting operation.

12. An inclination indicator as set forth in claim 10, wherein the resetting means has an operative connection with the connecting member and functions to lock said member in a position connected with the actuating bar during operation of the rotatable actuating means and also acts to disconnect said member from the actuation bar during the resetting operation, and means for locking the connecting member and the record carrier attached thereto against movement during the resetting operation.

13. An inclination indicating device including, a casing, a gravity responsive marking element within the casing, a movable record carrier below the marking element and normally spaced therefrom, an actuating bar arranged to be reciprocated, a connecting member pivoted to the record carrier and movable into connected and disconnected positions with respect to the actuating bar, a connecting pin on the actuating bar, a spring-actuated rotatable cam disk having a cam groove therein for receiving the connecting pin of the bar to operatively couple the parts together, said cam groove having a contour which imparts a double reciprocation to the bar and to the record carrier upon one revolution of the cam disk, a pair of radially extending shoulders on the periphery of the cam disk, and a locking bar normally disposed in the path of said shoulders to prevent rotation of the disk, and time controlled means co-acting with the locking bar to move said bar out of the path of said shoulders to allow rotation of said disk.

14. An inclination indicating device, as set forth in claim 13, wherein the shoulders on said cam disk are of different radial lengths whereby when the locking bar is initially moved it clears one shoulder but remains in the path of the other to allow only a partial rotation of the disk and only a single reciprocation of the record carrier, subsequent movement of the locking bar allowing it to clear the second shoulder to permit continued rotation of the disk and a second reciprocation of the record carrier.

15. As a sub-combination in an inclination indicating device, an actuating mechanism for imparting reciprocation to a record member including, an actuating bar, a connecting member pivoted to the record carrier and movable into connected and disconnected positions with respect to the actuating bar, and a spring-actuating cam disk having a cam groove therein a pin on said actuating bar engaged in said groove, said groove being of such contour as to impart a double reciprocation to the actuating bar and record carrier upon one revolution of the cam disk, and means for locking the pivoted connecting member and record carrier against movement when said member is in a position disconnected from the actuating bar.

FREDERICK LENZEN.
JOHN GORDON JACKSON.

REFERENCES CITED

The following references are of record in the file of this patent:

UNITED STATES PATENTS

| Number | Name | Date |
|---|---|---|
| 2,334,950 | Opocensky | Nov. 23, 1943 |